United States Patent Office

Re. 28,020
Reissued May 28, 1974

28,020

KILN DRYING PROCESS

Dallas S. Dedrick, Longview, Wash., assignor to Weyerhaeuser Company, Tacoma, Wash.

No Drawing. Original No. 3,404,464, dated Oct. 8, 1968, Ser. No. 602,502, Dec. 19, 1966. Application for reissue Sept. 2, 1970, Ser. No. 69,117
Int. Cl. F26b *3/00*
U.S. Cl. 34—30 27 Claims

Matter enclosed in heavy brackets [ ] appears in the original patent but forms no part of this reissue specification; matter printed in italics indicates the additions made by reissue.

ABSTRACT OF THE DISCLOSURE

A process for drying wood wherein heat energy is supplied to a load of wood in a confined zone by means of heated air whose temperature is constantly increased with respect to time. Additionally the process preferably utilizes circulating air to dry the wood, the air circulated in one direction across the wood under conditions of laminar flow.

Background of the invention

Freshly felled wood normally contains from about 30 to 200% by weight on an oven-dry basis water, depending upon the species of wood and other factors. This moisture is distributed throughout the wood by absorption on active areas (generally considered to be sterically available hydroxyl groups) in amorphous regions and has liquid-phase moisture in the gross voids of the wood, such as fiber lumens. Separation of the water from the wood can be carried out in many ways. If special techniques, such as centrifugation, mechanical pressure, air pressure and substitution of water with a more volatile polar liquid are ignored, there are at least two other fundamental means of drying wood. The first is a process of outward diffusion of water vapor (and possibly liquid) through a negative concentration gradient, with the final step being the diffusion of the moisture into the surrounding atmosphere. This is the mechanism of air or chamber drying, a very slow process. The second process is the application of energy to the interior of the wet or "green" lumber to vaporize or desorb the moisture and cause it to move outwardly to the interfaces of the wood and into the atmosphere. The rate of drying by this process is directly dependent upon the rate at which energy is admitted to the system. This is the principle of forced or accelerated drying. The present invention is an accelerated drying process employing distinctly different methods than heretofore known.

Prior are methods of kiln-drying wood have utilized closely controlled conditions of dry and wet bulb temperature of the atmosphere surrounding the wood and, to a large extent, closely controlled circulation of air across the wood surfaces. It has been generally thought that some relative humidity control is necessary for rapidly drying wood under controlled heating and circulating conditions. In the normal course of drying wood, the relative humidity of the drying atmosphere has been maintained high enough to prevent surface checking but low enough to enable rapid drying. Conventional drying schedules call for starting drying at relative humidities of greater than 90 percent. Under such conditions, drying is necessarily slow because of the slight temperature gradient. It has also been conventional practice to place the wood to be dried into a surrounding maintained at a high temperature. Under these conditions the initial rate of heat entry into the system is high and the rate of moisture removal is also high. As the process is continued, however, the temperature of the wood increases due to the fact that a portion of the entering energy is used to increase the temperature of the wood. As the wood becomes hotter the temperature gradient between the constant temperature surrounding and the wood surfaces decreases with the result that the rate of heat entry (and resultant vaporization and moisture removal) decreases. This is the familiar "falling rate" drying which is commonly used, this process requiring a long period of time to dry wood from a given moisture content to a final moisture content. When the source of heat energy in the "falling rate" process is a circulating fluid, such as air or air saturated with water vapor, which contacts the surfaces of the wood, the utilization of energy contained in the fluid is less efficient because only a small amount of heat energy is taken out by the wood during a pass. In drying wood, only that energy which enters the system and is available for use as latent heat is effective in producing free vapor which migrates outwardly to the wood surfaces and into the surrounding medium. At elevated temperatures faster diffusion results than that which takes place at lower temperatures. The vaporization which is desired in accelerating drying results, however, only from new heat energy entering the system, and the rate of vaporization is dependent upon the rate at which new heat energy enters the system, this being dependent upon the temperature difference which exists between the source of heat and the surfaces of the wood, other factors remaining constant. If the temperature gradient is large, the rate at which heat enters the system is high. Conversely, if the temperature gradient is low, the rate of heat entering the system is also low. A substantial amount of volatilization can take place at low temperatures if a temperature gradient can be established which will permit flow of heat into the system. For example, the entry of 10,000 calories per minute of latent heat will cause the evaporization of 17.1 grams of water at 20° C. (68° F.), 17.6 grams at 50° C. (122° F.), 18.5 grams at 100° C. (212° F.), and 19.9 grams at 150° C. (302° F.). Thus, the same amount of heat applied to water at 50° C. will evaporate 95% as much water as when applied at 100° C. and 88.5% as much as when applied at 150° C. In the drying of wood products, the use of lower temperatures is desirable, particularly at a higher moisture content in order to reduce the amount of degradiation of the wood and to reduce the heat loss from the drying equipment.

Summary

The present invention is designed to provide not only shorter kiln residence times but provide, at the same time, minimium structure stressing and reduced processing costs.

One of the objects of this invention is to provide a method whereby the drying rate of wood may be more predictably controlled.

Another object is to provide a method of drying wood in which the rate of moisture removal is maintained substantially constant over the period of drying or accelerated constantly over the period of drying.

Another object is to provide a method of drying which permits a substantial amount of moisture removal to be achieved at low temperatures.

A still further object is to provide a method for controlling stresses in the surface regions of wood during drying independent of humidity control of the heat-bearing medium.

Other objects of this invention will become apparent from a reading of the specification together with the accompanying examples.

These objects are accomplished by enclosing the wood to be dried in a confined zone and constantly increasing the temperature of the confined zone atmosphere surrounding the wood at a rate whereby the temperature gradient between the zone atmosphere and the wood surfaces is maintained substantially constant or accelerated for a period of time necessary to dry the wood to the desired moisture level. In essence, in the process of this invention, the temperature of the zone atmosphere is caused to rise continuously and thus maintain a predetermined gradient between the temperature of the heated fluid of the zone atmosphere and the surfaces of the wood, instead of the continuously decreasing gradient normally obtained in conventional processes due to the rising temperature of the wood.

Detailed description

The designation "wood" as used herein, is intended to include wood in the form of boards, dimension lumber, veneer, strips as well as other known wood products. The species of wood is not critical to the process, thus Douglas fir, hemlock, cedar and other woods may be processed in accordance with the invention. Kiln-residence time, as has been pointed out previously, is dependent upon the rate at which heat energy enters the wood charge in the kiln. This, other factors remaining constant, depends upon the temperature gradient which exists between the drying atmosphere and the wood surface temperature. The rate of heat entry into the wood according to the present invention is maintained constant or accelerated; thus, a rate of temperature rise is used which results in a constant rate of drying rather than the conventional falling rate. If a somewhat faster rate of temperature rise is employed, the drying rate may be made to increase as drying proceeds.

The temperatures to which the wood is subjected during the initial stages of drying are quite low. The kiln-residence factor of the invention is controlled primarily by manipulating the dry-bulb temperature of the heated fluid, usually air, which enters the charge so that the temperature gradient between the fluid and the wood is maintained at a level which will yield the desired rate of drying. As has been pointed out above, if the temperature of the confined zone surrounding the wood is kept constant the rise in temperature of the wood will result in a constantly decreasing air-wood gradient and a corresponding decreasing rate of drying. If, however, the temperature of the entering air is changed at a constant rate, the rate of change of the air-wood gradient will correspondingly be affected. When the rate of air temperature rise is maintained sufficiently rapid, the temperature gradient increases with time, the rate of drying increases, and the air temperature drop across the load increases, indicating that more work per unit time is being done.

The wood charge may be initially loaded into the kiln at ambient temperatures and the temperature of the zone atmosphere increased over a period of time to a maximum temperature of from 180 to 350° F. depending on the particular species and form of wood being dried. For example, it is preferred to initiate the drying of dimension lumber and boards at approximately 90–100° F. At a temperature rise of about 3° F. per hour, the lumber remains in the kiln for more than 33 hours before a zone atmosphere temperature of 200° F. is reached. Since a high rate of drying is maintained throughout this period of time by increasing the temperature at a constant rate, a major portion of the drying takes place at relatively low temperatures.

The rate at which the temperature of the zone atmosphere surrounding the wood must be increased is dependent upon the particular wood being processed, the amount of wood in the enclosed zone, and the geometric configuration of the wood in the enclosed zone. Generally, a dry-bulb temperature rise ranging from 1 to 10° F. per hour, and preferably from 2 to 5° F. per hour, is utilized for dimension lumber and boards. A higher rate may be used for veneer. The charge in the kiln is usually heated by circulating air or air saturated with water vapor over the wood. Air circulation in the kiln may be maintained at conventional rates when using the constant rate-temperature-rise technique of this invention, however, according to a further aspect of applicants invention, which may be used in conjunction with the constant-temperature-rise technique described, the rate of air circulation is important, as will be discussed.

In the drying of wood, particularly relatively thick lumber items, by the process of circulating heated fluid (generally air or air-water vapor mixture) across the exterior surfaces thereof, the rate of drying from the surface region is faster than from the interior. Thus the surface regions are dried to the fiber saturation point at which shrinkage begins before the inwardly adjacent regions begin to shrink. The surface tries to shrink but the shrinkage is opposed by the non-shrinking adjacent regions. A stress is set up which may result in serious structural defects such as checking or geometrical defects variously described as cupping, twisting, or warping. Furthermore, if the surface regions become quite dry, both heat and mass transfer are seriously reduced. It is thus necessary to maintain the surface regions as moist as possible relative to the rest of the wood to reduce degrade and to enhance mass and energy transfer. In common commercial processes this is generally accomplished by controlling the humidity of the circulating air so that an equilibrium between the vapor pressure of the air and that of the wood maintains a high moisture content of the wood. This works quite well for reducing stress, however, the process has definite limitations in practice. First, high equilibrium moisture contents are established only under conditions of high relative humidity (small web bulb depressions) which many commercial kilns are not capable of achieving or maintaining. Second, if a high humidity condition of the circulating fluid is established, the drying rate is quite low for reasons pointed out previously.

In addition to the use of high humidity air, conventional processes of drying wood utilize as high an air velocity as can be tolerated economically because more heat energy contacts the wood surfaces per unit time. It is also thought that higher air velocities guarantee turbulent flow of air across the air-wood interfaces, increasing heat transfer and the rate of the moisture removal. This latter property is considered desirable because the tendency for a reverse reaction, i.e., a transfer of water from the surrounding zone atmosphere to the wood surfaces, is reduced. This is noted in a bulletin entitled "Production-Kiln Drying" by John Devine on p. 90, wherein it is stated:

There is yet another more or less obscure factor in this speed of circulation. Engineers have known for a long time that there is a thin layer of air closely attached to any object surrounded by thin air. This film seems to cling tightly to the lumber and acts as a first class insulator. Furthermore, as water is evaporated, this vapor enters this film first, and raises the humidity of this film. Acting as an insulator against the transfer of heat, and as a blanket of high humidity air, this film greatly retards the drying of lumber. The faster the air can be blown across the lumber, the more thoroughly this film of air is removed, so the actual drying conditions we are trying to get are more nearly attained. . . . To get what we want on the lumber, it has been necessary to blow this film off the lumber as thoroughly as possible.

Applicant's invention takes a completely different approach and deliberately uses air velocities which yield laminar rather than turbulent flow over the wood surfaces. By so doing close control of the relative humidity of the circulating air is unnecessary.

Laminar flow is sometimes called "non-mixing" flow and is characterized by a layer of fluid at the wood-fluid interface which is substantially immobile. Immediately adjacent this layer is a second layer which moves at a slow rate. Thus, layer by layer, the main stream of moving fluid is approached without substantial intermixing between adjacent layers. The merit of the laminar flow aspect of this invention is that all of the moisture which is removed from the wood passes into the air layer adjacent the wood surfaces and from there diffuses into the main stream. There is a momentary pause involved with the result that the wood surfaces are kept reasonably moist due to the establishment of the layer of substantially immobile moist air immediately adjacent the wood surfaces.

In the case of laminar flow the static layer of fluid becomes a region through which all of the moisture escaping from the wood must pass. This layer, therefore, tends to become more saturated than the main stream of the fluid, making it possible to use air having a low relative humidity while maintaining relatively high humidity conditions at the wood interfaces. In the case of turbulent flow the wood surfaces become dry and stressed under the humidity of the circulating air which, as pointed out above, cannot be kept at a very high level. Utilizing laminar flow conditions it is possible to dry the wood at a fast rate since the amount of available heat energy passing over the wood surfaces per unit time is large because of the large wet-bulb depression employed. The use of a lower velocity medium also has a significant economic advantage. The present invention thus comprises the controlled and deliberate application of laminar air flow in the drying of wood for the purpose of achieving both quality maintenance and relatively fast rates of drying.

The application of low velocity air in conjunction with the constant rate-temperature-rise process as described previously results in the rapid drying of wood with minimum degradation, such as surface checking and honeycombing.

When utilizing the constant rate-temperature-rise process as described in conjunction with the low air velocity process (laminar flow), there is no need for close humidity control in the sense that moisture is necessarily added to the air. There is a need, however, for a humidity-sensing device which will cause an opening of the vents for discharge of moisture to the atmosphere should be humidity in the kiln build up to a level such that the temperature drop across the load required for the desired rate of drying cannot be achieved because of an exceedingly low wet-bulb depression. The advantage of using low air velocities in conjunction with the continuously rising temperature technique is that it removes the necessity for close humidity control, simplifies processing, and reduces the cost of the drying.

It is desirable to use very low air velocities through the lumber stacks, that is in the range of 100 to 200 feet per minute (Reynolds Number of from 1500 to 2000) contrasted with the turbulent air velocities used in conventional kiln-drying processes. It is also preferred to use no air reversal during drying as this tends to halt drying on one side of the charge in the kiln and accelerate it on the other side at the time of reversal. The process of this invention, as described, results in a substantially linear temperature drop across the charge of lumber or veneer, all the wood accepting heat at the same approximate rate. Uniform drying takes place across the charge, thus eliminating the need for air reversal.

Lumber or veneer dried by utilizing the constant rate-temperature-rise process alone or in conjunction with the low-air velocity process as herein described has shown almost complete freedom of surface and internal checks, a minimum protrusion and loss of knots, less over-all shrinkage of the lumber, even at a 2 to 5% final moisture content based on an oven-dry basis of wood, an excellent moisture uniformity, and appreciable reduction in drying time over conventional practices. The following examples are intended to illustrate the invention and are not intended to be limiting in any way.

Example I

A charge of 2 x 8′ hemlock with an initial moisture content of 80% by weight of an oven-dry basis was placed in a conventional kiln. The lumber to be dried was stacked in open arrangement so that free circulation of air was obtained. The charge was about 8 feet wide and ¾″ spacing elements were used. Air having a relative humidity of 50% and a velocity of 180 f.p.m. (Reynolds Number 1750 at 100° F.) was passed unidirectionally over the charge at an initial dry bulb temperature of 90° F. The temperature of the circulating air was continually increased from 90° F. to 330° F. over a period of 40 hours (6° F./hr.). The vents of the kiln were slightly cracked. No control of the wet-bulb temperature was attempted. The hemlock, after drying for the period of time mentioned, had an average moisture content of 6% and was characterized by minimum degrade.

Example II

Four kiln charges of green 2 x 8 hemlock lumber totalling 5632 board feet were dried using a "conventional" schedule:

| Kiln hours | Dry bulb (° F.) | Wet bulb (° F.) |
|---|---|---|
| 0–12 | 180 | 165 |
| 12–24 | 180 | 160 |
| 24–48 | 175 | 150 |
| 48–72 | 174 | 140 |
| 72–104 | 160 | 145 |
| 104–120 | 160 | 150 |

Air was circulated over the charges at a velocity of about 550 f.p.m. with the air direction reversed every four hours. The initial moisture content of the lumber was 73.2% while the final moisture content was 14.4%. During residence in the kiln 19,499 lbs. of "green" lumber lost 6,617 lbs. of water. A total of 59,200,000 cu. ft. of air was circulated over the lumber or an average of 8950 cu. ft. for each pound of water removed. The average shell-to-core moisture content gradient was 7.9% (10.4% shell and 18.3% core).

An equal quantity of identical charges of 2 x 8 hemlock stock was dried using the constantly rising dry bulb technique of the invention. The temperature of the circulating air in the kiln was raised 6° F./hr. from 90° F. to 280° F. over a period of 33 hours after which the dry bulb temperature was allowed to remain constant for an additional 27 hours, giving a total kiln residence time of 60 hours. Air was circulated unidirectionally over the charges at a velocity of 180 f.p.m. Utilizing this process 19,786 lbs. of "green" lumber having an initial moisture content of 83.5% lost 7,731 lbs. of water to give kiln-dried lumber having a final moisture content of 11.8%. A total of 13,400,000 cu. ft. of air was circulated over the lumber, or an average of 1730 cu. ft./lb. of water removed. The average shell-to-core moisture content gradient was 6.8% (8.5% shell and 15.3% core). The product quality was equivalent to that dried by conventional means.

Example III

A charge of 121 2 x 8″ x 8′ hemlock boards was dried from an initial moisture content of 73% to a final moisture content of less than 6% in 52 hours starting at an initial dry-bulb temperature of 90° F. The temperature of the circulating air in the kiln was raised [3°] *4°* F./hr. until a temperature of 297° F. was reached. The air velocity was 600 f.p.m. No attempt was made to control the wet-bulb temperature. The quality of the kiln-dried product was excellent, with less than 2% of the boards having structural defects.

Example IV

A charge of 180 2″ x 6″ x 8′ hemlock boards were dried from an initial moisture content of 84% to a final average moisture content of less than 8%. The temperature of the circulating air in the kiln was raised at the rate of 6° F./hr. from 90° F. to 234° F. *was reached. Thereafter the dry bulb temperature was maintained constant at 24° F.* Total kiln residence time was 97 hours. The quality of the kiln-dried boards was excellent. *Only three boards contained noticeable surface checks.*

Example V

A charge of ⅛" hemlock veneer is dried using a constant temperature rise of about 9° F./min. between an initial temperature of 90° F. and a final temperature 360° F. for a period of 30 minutes. The velocity of the circulating air is 200 f.p.m. No air reversal is utilized.

Example VI

A charge of 2 x 8" hemlock having an average initial moisture content of 63.3% was placed in a kiln similar to that of Example I and dried according to the prior are schedule below. The load was 8' feet wide and ½ inch spacing elements were used.

| Kiln hours | Dry bulb (° F.) | Wet bulb (° F.) |
|---|---|---|
| 0–12 | 180 | 170 |
| 12–24 | 180 | 165 |
| 24–48 | 175 | 155 |
| 48–72 | 175 | 145 |
| 72–96 | 170 | 145 |
| 96–120 | 155 | 145 |

Air was passed over the wood surfaces at a velocity of about 550 f.p.m. (Reynolds Number 4000 at 100° F.) and was reversed every 4 hours. The lumber, after drying, had a final average moisture content of about 13.7% and was of good quality. The total drying time required was about 120 hours, much longer than the time required when employing the process of this invention.

Having described my invention what I claim is:

1. In a method for the rapid reduction of the moisture content of wood utilizing a controlled heated fluid [circulating] *flowing* relative to the surfaces of the wood in a confined zone to supply heat energy to the wood and remove the water vapor emerging from the surfaces of the wood, the improvement which comprises, (1) adjusting the temperature of the heated fluid in the confined zone to a predetermined level above the temperature of the wood, (2) increasing the temperature of the heated fluid in the confined zone surrounding the wood at a rate whereby the temperature *difference* [gradient] between the heated fluid and the wood surfaces is maintained substantially constant or [accelerated] *increased* with respect to time, and (3) maintaining these conditions until the moisture content of the wood is reduced to the desired level.

2. Method according to claim 1 wherein the heated fluid is air containing an amount of moisture sufficient to prevent degradation of the wood.

3. Method according to claim 1 wherein the rate of rise of temperature per unit time ranges from about 1 to 10° F. per hour.

4. Method according to claim 1 wherein the wood is in the form of lumber.

5. Method according to claim 1 wherein the wood is in the form of veneer.

6. Method according to claim 1 wherein the wood is selected from the group consisting of hemlock, Douglas fir, and Western red cedar.

7. In a method for the rapid reduction of the moisture content of wood without degradation of the wood and without close humidity control utilizing a controlled heating fluid [circuating] *flowing* relative to the surfaces of the wood in a confined zone to supply heat energy to the wood and remove water vapor emerging from the surfaces of the wood, the improvement which comprises:

(1) adjusting the temperature of the heated fluid to a predetermined level above the temperature of the wood, (2) increasing the temperature of the heated fluid continuously whereby the rate of rise is substantially constant with respect to time, (3) simultaneously with step (2) [circulating] *flowing* the heated fluid around the wood in the enclosed zone under conditions of laminar flow so as to maintain a substantially static layer of moisture-laden air on the surfaces of the wood, and (4) maintaining these conditions until [the moisture content of the wood is reduced to the desired level] *a maximum temperature in the range of 180° F. to 350° F. in the heated fluid is achieved.*

8. Method according to claim 7 wherein the heated fluid [is circulated] *flows* across the wood surfaces unidirectionally during the time of residence in the kiln.

9. Method according to claim 7 wherein the heated fluid is air relatively low in moisture content having a [circulation] velocity of from 100 to 200 f.p.m.

10. Method according to claim 7 wherein the rate of temperature rise per unit time ranges from about 1 to 10 degrees F. per hour.

11. Method according to claim 7 wherein the wood is in the form of lumber.

12. Method according to claim 7 wherein the wood is in the form of veneer.

13. Method according to claim 7 wherein the wood is selected from the group consisting of hemlock, Douglas fir, and Western red cedar.

*14. A drying process for removing moisture in wood comprising the steps of*

*adjusting the temperature of a drying fluid adjacent the wood to a predetermined temperature above the temperature of a surface of said wood;*

*flowing said drying fluid across said surface; and*

*increasing the temperature of said drying fluid at a rate whereby the temperature difference between said surface and said drying fluid is constant or increases with respect to time during removal of at least a major portion of said moisture.*

*15. The method of claim 23 wherein said drying fluid flows across the surface of said wood under laminar flow conditions.*

*16. The method of claim 15 wherein said drying fluid has an air velocity in the range of 100 to 200 feet per minute.*

*17. The method of claim 23 wherein the direction of flow of said drying fluid is not changed during the course of drying.*

*18. The method of claim 23 wherein said rate of increase in temperature ranges from about 1 to 10 degrees F. per hour.*

*19. The method of claim 1 wherein said heated fluid has its temperature adjusted initially to a temperature in the range of 90° to 100° F. to establish said predetermined level.*

*20. The method of claim 7 wherein said heated fluid has its temperature adjusted initially to a temperature in the range of 90° F. to 100° F. to establish said predetermined level.*

*21. The process of claim 14 wherein said wood is dried to an average final moisture content in the range of about 15 percent to about 2 percent by weight on an oven-dry basis.*

*22. The process of claim 14 wherein the temperature of said drying fluid is increased at a constant rate with respect to time throughout the major portion of the drying process.*

*23. The process of claim 14 wherein said step of increasing the temperature of said drying fluid at a rate whereby the temperature difference between said surface and said drying fluid is constant or increases with respect to time is continued throughout the drying process.*

*24. The process of claim 14 wherein said temperature of said drying fluid is increased to a maximum temperature in the range of 180° F. to 350° F.*

*25. The process of claim 1 wherein said step of increasing the temperature of said drying fluid at a rate whereby the temperature difference between said surface and said drying fluid is constant or increases with respect to time is continued throughout the drying process.*

*26. The process of claim 14 wherein said wood is in the form of a stacked charge of lumber and said fluid is flowed substantially uniformly throughout the charge.*

*27. The process of claim 26 wherein said flow is unidirectional.*

References Cited

The following references, cited by the Examiner, are of record in the patented file of this patent or the original patent.

UNITED STATES PATENTS

| | | | |
|---|---|---|---|
| 1,125,862 | 1/1915 | McMullen et al. | 34—26 X |
| 2,489,820 | 11/1949 | Russell et al. | 34—219 X |
| 3,262,216 | 7/1966 | Dugger | 34—26 |
| 1,621,855 | 3/1927 | Secord | 34—30 |

CARROLL B. DORITY, JR., Primary Examiner